United States Patent
Wolrich et al.

(10) Patent No.: US 7,376,950 B2
(45) Date of Patent: May 20, 2008

(54) SIGNAL AGGREGATION

(75) Inventors: Gilbert Wolrich, Framingham, MA (US); Mark B. Rosenbluth, Uxbridge, MA (US); Debra Bernstein, Sudbury, MA (US); Myles J. Wilde, Charlestown, MA (US)

(73) Assignee: Intel Corporation, Santa Clara, CA (US)

( * ) Notice: Subject to any disclaimer, the term of this patent is extended or adjusted under 35 U.S.C. 154(b) by 941 days.

(21) Appl. No.: 10/142,372

(22) Filed: May 8, 2002

(65) Prior Publication Data

US 2003/0212852 A1    Nov. 13, 2003

(51) Int. Cl.
G06F 9/46    (2006.01)
G06F 13/28    (2006.01)

(52) U.S. Cl. .................. 718/100; 710/22; 710/23; 710/24; 711/167; 711/168; 711/169

(58) Field of Classification Search ........ 711/100–221, 711/1–6; 710/1–30; 718/100–108
See application file for complete search history.

(56) References Cited

U.S. PATENT DOCUMENTS

| | | | | | |
|---|---|---|---|---|---|
| 5,463,643 | A | * | 10/1995 | Gaskins et al. | 714/766 |
| 5,530,845 | A | * | 6/1996 | Hiatt et al. | 703/27 |
| 5,530,888 | A | * | 6/1996 | Amasaki et al. | 710/5 |
| 5,701,516 | A | * | 12/1997 | Cheng et al. | 710/22 |
| 5,732,285 | A | * | 3/1998 | Harrison et al. | 710/56 |
| 5,781,918 | A | * | 7/1998 | Lieberman et al. | 711/5 |
| 5,787,459 | A | * | 7/1998 | Stallmo et al. | 711/112 |
| 5,920,702 | A | * | 7/1999 | Bleidt et al. | 709/231 |
| 6,065,092 | A | * | 5/2000 | Roy | 711/5 |
| 6,076,139 | A | | 6/2000 | Welker et al. | |
| 6,233,663 | B1 | * | 5/2001 | Yamamoto et al. | 711/165 |
| 6,334,159 | B1 | * | 12/2001 | Haupt | 710/6 |
| 6,370,596 | B1 | * | 4/2002 | Dakhil | 710/15 |
| 6,370,668 | B1 | * | 4/2002 | Garrett et al. | 714/763 |
| 6,397,273 | B2 | * | 5/2002 | Chilton | 710/52 |
| 6,622,217 | B2 | * | 9/2003 | Gharachorloo et al. | 711/141 |
| 6,622,218 | B2 | * | 9/2003 | Gharachorloo et al. | 711/141 |
| 6,708,248 | B1 | * | 3/2004 | Garrett et al. | 711/104 |
| 6,785,785 | B2 | * | 8/2004 | Piccirillo et al. | 711/157 |
| 6,983,350 | B1 | * | 1/2006 | Wheeler et al. | 711/151 |
| 7,039,782 | B2 | * | 5/2006 | Garrett et al. | 711/167 |
| 7,069,467 | B2 | * | 6/2006 | Asako | 714/6 |
| 2002/0053010 | A1 | * | 5/2002 | Piccirillo et al. | 711/170 |

FOREIGN PATENT DOCUMENTS

WO    WO 99/34294    7/1999
WO    WO 01/48606    7/2001

OTHER PUBLICATIONS

Cabrera, Luis-Felipe et al. "SWIFT: A Storage Architecture for Large Objects." IEEE. Oct. 1991.*
Childers, Cynthia et al. "The Performance of Non-Redundant Striping in a SSA Disk Array." Feb. 8, 1999.*

* cited by examiner

Primary Examiner—Meng-Ai An
Assistant Examiner—Jennifer N To
(74) Attorney, Agent, or Firm—Fish & Richardson P.C.

(57) ABSTRACT

The invention features a method for transferring data to programming engines using multiple memory channels, parsing data over at most two channels in the memory channels, and establishing at most two logical states to signal completion of a memory transfer operation.

9 Claims, 5 Drawing Sheets

SIGNAL AGGREGATION

BACKGROUND

Network processors typically use single channel or multiple memory channels to provide required bandwidth for data processing functions where data are stored and then forwarded to a destination, for example, as in store-and-forward functions performed by network processors. For wide memory structures, read-modify-write operations are often required, whereas for multiple channel designs, interleaving block addresses or "stripping" may be used to spread the memory accesses across the channels so that all channels may be utilized.

DESCRIPTION

Figure 1:
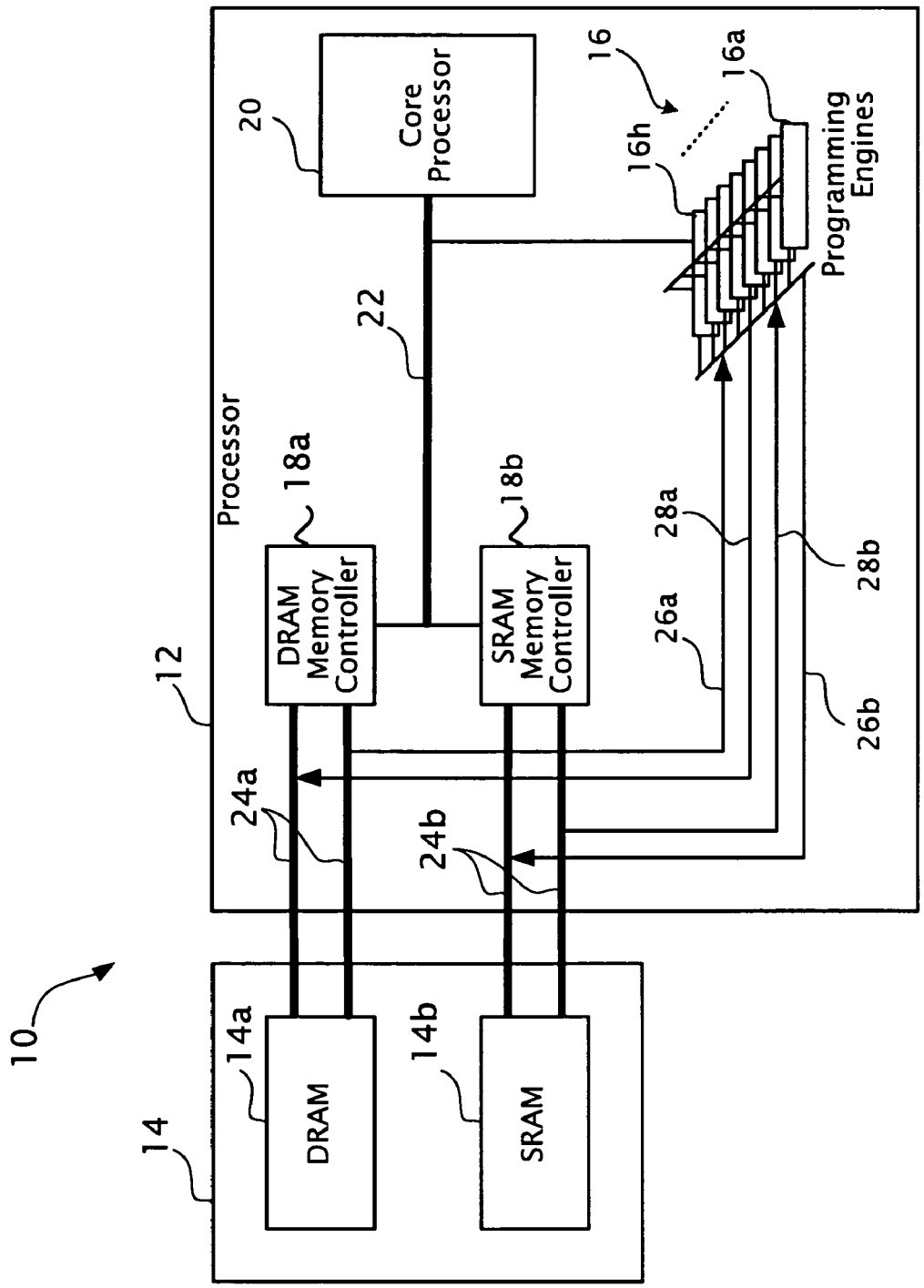
FIG. 1 is a block diagram of a processing system.

Architecture:

Referring to FIG. 1, a computer processing system 10 includes a parallel, hardware-based multithreaded network processor 12. The hardware-based multithreaded processor 12 is coupled to a memory system or memory resource 14. Memory system 14 includes dynamic random access memory (DRAM) 14a and static random access memory 14b (SRAM). The processing system 10 is especially useful for tasks that can be broken into parallel subtasks or functions. Specifically, the hardware-based multithreaded processor 12 is useful for tasks that are bandwidth oriented rather than latency oriented. The hardware-based multithreaded processor 12 has multiple functional microengines or programming engines 16a-16h (collectively, programming engines 16) each with multiple hardware controlled threads that are simultaneously active and independently work on a specific task.

The programming engines 16 each maintain program counters in hardware and states associated with the program counters. Effectively, corresponding sets of context or threads can be simultaneously active on each of the programming engines 16 while only one is actually operating at any one time.

In this example, eight programming engines 16a-16h are illustrated in FIG. 1. Each programming engine 16a-16h processes eight hardware threads or contexts. The eight programming engines 16a-16h operate with shared resources including memory resource 14 and bus interfaces (not shown). The hardware-based multithreaded processor 12 includes a dynamic random access memory (DRAM) controller 18a and a static random access memory (SRAM) controller 18b. The DRAM memory 14a and DRAM controller 18a are typically used for processing large volumes of data, e.g., processing of network payloads from network packets. The SRAM memory 14b and SRAM controller 18b are used in a networking implementation for low latency, fast access tasks, e.g., accessing look-up tables, memory for the core processor 20, and the like.

The eight programming engines 16a-16h access either the DRAM memory 14a or SRAM memory 14b based on characteristics of the data. Thus, low latency, low bandwidth data are stored in and fetched from SRAM memory 14b, whereas higher bandwidth data for which latency is not as important, are stored in and fetched from DRAM memory 14a The programming engines 16 can execute memory reference instructions to either the DRAM controller 18a or SRAM controller 18b.

The hardware-based multithreaded processor 12 also includes a processor core 20 for loading microcode control for the programming engines 16. In this example, although other types of processor cores may be used in embodiments of this invention, the processor core 20 is an XScale™ based architecture, designed by Intel® Corporation, of Santa Clara, Calif.

The processor core 20 performs general-purpose computer type functions such as handling protocols, exceptions, and extra support for packet processing where the programming engines 16 pass the packets off for more detailed processing such as in boundary conditions.

The processor core 20 executes an operating system (not shown). Through the operating system (OS), the processor core 20 can call functions to operate on the programming engines 16a-16h. For the core processor 20 implemented as an XScale™ architecture, operating systems such as Microsoft® NT real-time of Microsoft® Corporation, of Seattle, Wash., VxWorks® real-time operating system of WindRiver®, of Alameda, Calif., or a freeware OS available over the Internet can be used.

Advantages of hardware multithreading can be explained by SRAM or DRAM memory accesses. As an example, an SRAM access requested by a context (e.g., Thread_0), from one of the programming engines 16, e.g., programming engine 16a, will cause the SRAM controller 18b to initiate an access to the SRAM memory 14b. The SRAM controller 18b accesses the SRAM memory 14b, fetches the data from the SRAM memory 14b, and returns data to a requesting programming engine 16.

During an SRAM access, if one of the programming engines 16a-16h has a single thread that could operate, that programming engine would be dormant until data was returned from the SRAM memory 14b.

By employing hardware context swapping within each of the programming engines 16a-16h, the hardware context swapping enables other contexts with unique program counters to execute in that same programming engine. Thus, another thread e.g., Thread_1 can function while the first thread, Thread_0, is awaiting the read data to return. During execution, Thread_1 may access the DRAM memory 14a. While Thread_1 operates on the DRAM unit, and Thread_0 is operating on the SRAM unit, a new thread, e.g., Thread_2 can now operate in the programming engine 16. Thread_2 can operate for a certain amount of time until it needs to access memory or perform some other long latency operation, such as making an access to a bus interface. Therefore, simultaneously, the multi-threaded processor 12 can have a bus operation, an SRAM operation, and a DRAM operation all being completed or operated upon by one of the programming engines 16 and have one more threads or contexts available to process more work.

The hardware context swapping also synchronizes the completion of tasks. For example, two threads can access the shared memory resource, e.g., the SRAM memory 14b.

Each one of the separate functional units, e.g., the SRAM controller 18b, and the DRAM controller 18a, when they complete a requested task from one of the programming engine threads or contexts reports back a flag signaling completion of an operation. When the programming engines 16a-16h receive the flag, the programming engines 16a-16h can determine which thread to turn on.

One example of an application for the hardware-based multithreaded processor 12 is as a network processor. As a network processor, the hardware-based multithreaded processor 12 interfaces to network devices such as a Media Access Controller (MAC) device, e.g., a 10/100BaseT Octal MAC or a Gigabit Ethernet device compliant with IEEE 802.3. In general, as a network processor, the hardware-based multithreaded processor 12 can interface to any type of communication device or interface that receives or sends large amount of data. The computer processing system 10 functioning in a networking application can receive network packets and process those packets in a parallel manner.

Figure 2:
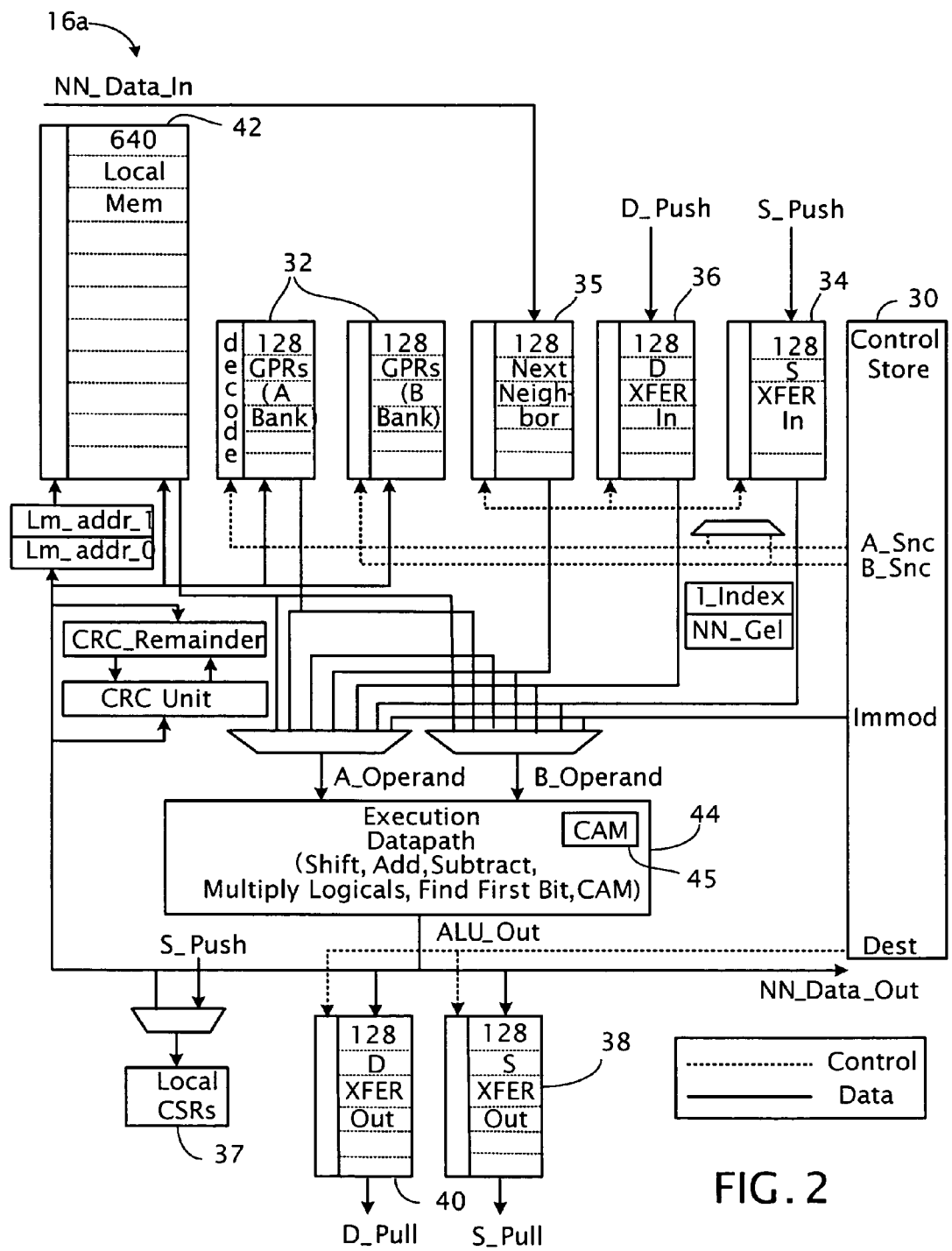
FIG. 2 is a detailed block diagram of the processing system of FIG. 1 where one of the embodiments of the invention may be advantageously practiced.

Registers in Programming Engines:

Referring to FIG. 2, one exemplary programming engine 16a from the programming engines 16, is shown. The programming engine 16a includes a control store 30, which in one example includes a RAM of 4096 instructions, each of which is 40-bits wide. The RAM stores a microprogram that the programming engine 16a executes. The microprogram in the control store 30 is loadable by the processor core 20 (FIG. 1).

In addition to event signals that are local to an executing thread, the programming engine 16a employs signaling states that are global. With signaling states, an executing thread can broadcast a signal state to all programming engines 16a-16h. Any and all threads in the programming engines can branch on these signaling states.

As described above, the programming engine 16a supports multi-threaded execution of eight contexts. This allows one thread to start executing just after another thread issues a memory reference and must wait until that reference completes before doing more work. Multi-threaded execution is critical to maintaining efficient hardware execution of the programming engine 16a because memory latency is significant. Multi-threaded execution allows the programming engines 16 to hide memory latency by performing useful independent work across several threads.

The programming engine 16a, to allow for efficient context swapping, has its own register set, program counter, and context specific local registers. Having a copy per context eliminates the need to move context specific information to and from shared memory and programming engine registers for each context swap. Fast context swapping allows a context to perform computations while other contexts wait for input-output (I/O), typically, external memory accesses to complete or for a signal from another context or hardware unit.

General Purpose Registers

The programming engine 16a executes the eight contexts by maintaining eight program counters and eight context relative sets of registers. A number of different types of context relative registers, such as general purpose registers (GPRs) 32, inter-programming agent registers (not shown), Static Random Access Memory (SRAM) input transfer registers 34, Dynamic Random Access Memory (DRAM) input transfer registers 36, SRAM output transfer registers 38, DRAM output transfer registers 40.

The GPRs 32 are used for general programming purposes. The GPRs 32 are read and written exclusively under program control. The GPRs 32, when used as a source in an instruction, supply operands to an execution datapath 44.

The execution datapath 44 can take one or two operands, perform an operation, and optionally write back a result. The execution datapath 44 includes a content addressable memory (CAM) 45. Each entry of the CAM 45 stores a 32-bit value, which can be compared against a source operand. All entries are compared in parallel and the result of the lookup is a 6-bit value.

When used as a destination in an instruction, the GPRs 32 are written with the result of the execution datapath 44. The programming engine 16a also includes I/O transfer registers 34, 36, 38 and 40 which are used for transferring data to and from the programming engine 16a and locations external to the programming engines 16a, e.g., the DRAM memory 14a, the SPAN memory 14b, and the like.

Transfer Registers

The programming engine 16a also includes transfer registers 34, 36, 38 and 40 Transfer registers 34, 36, 38 and 40 are used for transferring data to and from the programming engine 16a and locations external to the programming engine, e.g., DRAMs, SRAMs etc. There are four types of transfer registers as illustrated in FIG. 2, namely, input transfer registers and output transfer registers.

The input transfer registers, when used as a source in an instruction, supply operands to the execution datapath 44, whereas output transfer registers are written with the result from the execution datapath 44 when utilized as a destination in an instruction.

Local Control and Status Registers (CSRs)

Local control and status registers (CSRs) 37 are external to the execution datapath 44 and hold specific purpose information. They can be read and written by special instructions (local_csr_rd and local_csr_wr) and are typically accessed less frequently than datapath registers.

Next Neighbor Registers

The programming engine 16a also includes one hundred and twenty eight (128) Next Neighbor (NN) registers, collectively referred to as NN registers 35. Each NN Register 35, when used as a source in an instruction, also supplies operands to the execution datapath 44. Each NN register 35 is written either by an external entity, not limited to, an adjacent programming engine, or by the same programming engine 16a where each NN register 35 resides. The specific register is selected by a context-relative operation where the register number is encoded in the instruction, or as a ring operation, selected via, e.g., NN_Put (NN write address) and NN_Get (NN read address) in the CSR Registers.

NN_Put registers are used when the previous neighboring programming engine executes an instruction with NN_Put as a destination. The NN register selected by the value in this register is written, and the value in NN_Put is then incremented (a value of 127 wraps back to 0). The value in this register is compared to the value in NN_Get register to determine when to assert NN— Full and NN_Empty status signals.

NN_Get registers are used when the NN register 35 is accessed as a source, which is specified in the source field of the instruction. The NN register selected by the value in this register is read, and the value in NN Put is then decremented (a value of 127 wraps back to 0). The value in this register is compared to the value in the NN_Put register to determine when to assert NN_Full and NN_Empty status signals.

Specifically, when each NN register 35 is used as a destination in an instruction, the instruction result data are sent out of the programming engine 16*a*, typically to another, adjacent programming engine. On the other hand, when the NN register 35 is used as a destination in an instruction, the instruction result data are written to the selected NN Register 35 in the programming engine 16*a*. The data are not sent out of the programming engine 16*a* as it would be when each NN register 35 is used as a destination. Each NN register 35 is used in a context pipelining method, as described below.

A local memory 42 is also used. The local memory 42 includes addressable storage located in the programming engine 16*a*. The local memory 42 is read and written exclusively under program control. The local memory 42 also includes variables shared by all the programming engines 16. Programming engines 16*a*-16*h* modify shared variables in various assigned tasks during, e.g., functional pipeline stages.

Context Pipelining:

Each of the programming engine 16 supports multi-threaded execution of eight contexts. One reason for this is to allow one thread to start executing just after another thread issues a memory reference and must wait until that reference completes before doing more work. This behavior is critical to maintaining efficient hardware execution of the programming engines 16*a* -16*f* because memory latency is significant. Stated differently, if only a single thread execution was supported, the programming engine would sit idle for a significant number of cycles waiting for references to complete and thereby reduce overall computational throughput. Multi-threaded execution allows a programming engine to hide memory latency by performing useful independent work across several threads.

The programming engines 16*a*-16*h* (FIG. 1) each have eight available contexts. To allow for efficient context swapping, each of the eight contexts in the programming engine has its own register set, program counter, and context specific local registers. Having a copy per context eliminates the need to move context specific information to/from shared memory and programming engine registers for each context swap. Fast context swapping allows a context to do computation while other contexts wait for I/O, typically external memory accesses, to complete or for a signal from another context or hardware unit.

Figure 5:
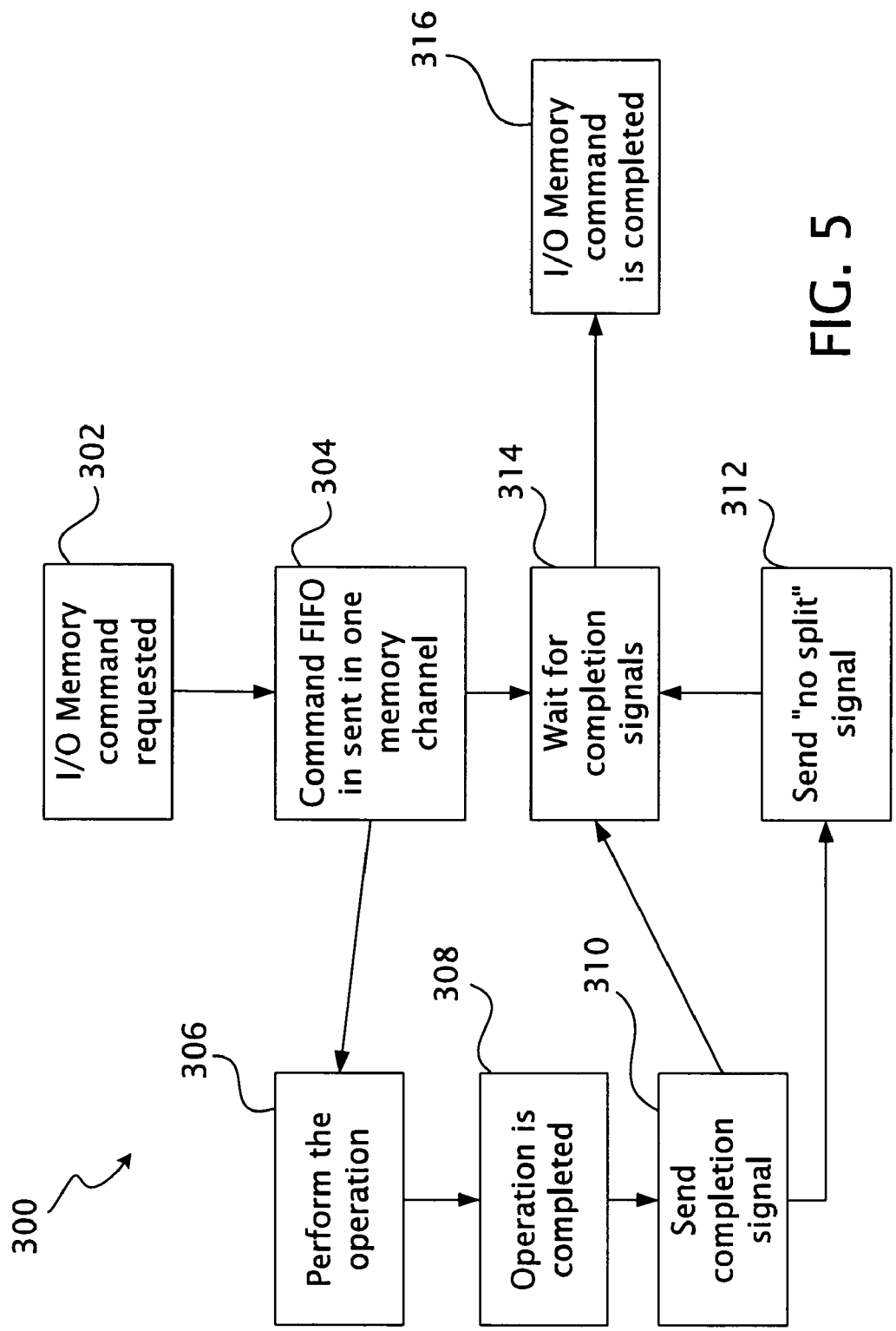
FIG. 5 is a flowchart illustrating another memory transfer operation.

Referring now to FIG. 5, the context for a specific assigned task is maintained on the programming engines 16*a*-16*c* using CAM 45*a*-45*c*. The packets are processed in a pipelined fashion similar to an assembly line using NN registers 35*a*-35*c* to pass data from one programming engine to a subsequent, adjacent programming engine. Data are passed from one stage 90*a* to a subsequent stage 90*b* and then from stage 90*b* to stage 90*c* of the pipeline, and so forth. In other words, data are passed to the next stage of the pipeline allowing the steps in the processor cycle to overlap. In particular, while one instruction is being executed, the next instruction can be fetched, which means that more than one instruction can be in the "pipe" at any one time, each at a different stage of being processed.

For example, data can be passed forward from one programming engine 16 to the next programming engine 16 in the pipeline using the NN registers 35*a*-35*c*, as illustrated by example in FIG. 5. This method of implementing pipelined processing has the advantage that the information included in CAM 45*a*-45*c* for each stage 90*a*-*c* is consistently valid for all eight contexts of the pipeline stage. The context pipeline method may be utilized when minimal data from the packet being processed must advance through the context pipeline.

Read/Write Memory Operations:

In memory write operations, the write data is loaded into output transfer registers prior to issuing the write command. On the other hand, for memory read commands, the data read from a memory is returned to input transfer registers. Upon completion of a memory operation, the issuing context may be signaled.

When substantial data is involved, to perform read/write operations of store-and-forward data used by network processors, rather than using a very wide single memory channel, multiple memory channels may be used. Using multiple memory channels associated with processes for reading and writing data into these channels replaces the use of very wide single channel memories.

Multiple memory channels may be implemented to provide the required bandwidth for store-and-forward network processors as well as very high frequency of read modify write operations. In a multiple channel design, interleaving block addresses (i.e., "striping") is required to spread accesses across the channels. Accordingly, data may be "stripped" into relatively small block sizes such as 64 to 128 bytes. Memory commands also specify a burst length. In other words, the data blocks may be sent either using a single memory channel or spread over multiple memory channels (e.g., two memory channels). The process by which two memory channels are used meets the stringent performance requirements of network processors such as the multi-threaded processor 12 of FIG. 1, which involves significantly increased amount of data traffic and frequent read and write operations from and to memory which are required.

When data stripping is performed, the completion of the operation is tracked. When one memory channel is used, FIFO (first-in, first-out) rules are applied to the data blocks. However, when the data blocks are spread into two memory channels, the operation is not completed simultaneously on each of the channels, thus other processes for keeping track of the completion of the program may be used.

Memory operations with a length greater than one memory location may cross memory units or may be sorted into separate commands within a memory when different banks in the memory chips must be accessed. Additionally, returning a completion indication to a context that issues a memory command has the added complexity of determining when both parts of a split memory reference has been completed.

To this end, a signal aggregator logic (e.g., a flag or flop) may be used. The signal aggregator logic determines from the memory command whether the memory reference has split between memory channels or FIFOs within a memory controller. In addition, the signal aggregator logic sets a state flop indicating whether one or two signals are to be expected for a particular memory reference. If only one signal is expected when the memory controller issues a completion signal, the signal is immediately forwarded to the issuing processing context. If two signals are expected when the first signal for the reference is detected, another flop is set such as to allow the signal to be set at the issuing processing thread when the second signal for the reference is detected.

That is, the signal aggregator logic is added to the read/write command to indicate if the data block has been split or spread into two memory channels. If the signal aggregator logic indicates that no spread has occurred, FIFO rules are applied. Upon completion of the last data block processing, the memory controller issues a completion signal or flag to an issuing processing thread. If the flag indicates that the data blocks are spread into two memory channels, two signals are expected: (1) a first signal upon completion of the first memory channel and (2) a second signal upon completion of the second memory channel. In the latter case, the memory controller sends a completion signal when it has received the completion signal from each of the memory channels.

To this end, the programming engines 16a-16h utilize a generalized thread signaling (GTS) technique where each thread may specify 1 to 16 signals for each I/0 command "acknowledge." The multithreaded processor 12, for example, with 16 programming engines, each of which runs 8 contexts or threads, would require a total of 2,408 signals aggregating two flop state machines (i.e., 16 times 16 times 8=2048). Thus, each processing thread can use 16 signals, applied on the multithreaded processor 12 with 16 programming engines with 8 contexts or threads resulting in 2048 signals.

GTS Signaling Mechanism:

The GTS signaling mechanism advantageously allows the elimination of signal aggregating logic for memory references spanning two memory channels. As such, the flag used to indicate if the data blocks are spread into two memory channels may be removed. The need for signal aggregating logic for memory references that either span two memory channels or are split into two FIFOs of a memory controller can be eliminated by the use of the GTS signaling mechanism.

As described above, without the GTS optimization, memory data operations would require three flags: (1) a flag indicating whether the data has been parsed or spread (Signal Aggregator Logic or Hardware Flag); (2) a flag indicating the completion of the first memory channel (Logical Flag); and (3) a flag indicating the completion of the second memory channel (Logical Flag).

As described, memory data optimization utilizes logical software flags. The memory controller checks values for the signal aggregator logic. If the value of the signal aggregator logic is indicative of no spread, the memory controller checks the value of the first flag. This flag is updated when the operation on the memory channel has been completed. If the value indicates a spread, the memory controller waits for the completion signal from both memory channels by using two logical flags.

Therefore, the signal aggregator logic hardware flag may be replaced by the use of both logical flags, thus advantageously providing memory data transfer and processing. The first flag indicates the completion of the memory operation in the first memory channel and the second flag indicates the completion operation in the second memory channel, or in the alternative, indicates that the data is not to be spread, in which case, the first flag is considered for the memory operation.

In the case where the data block are spread into two memory channels, the memory controller receives two completion signals.

Memory commands which, may be parsed into two commands in the memory controller request an even numbered signal. When the portion of the command at the start of the burst is completed, the even numbered signal specified in the memory command is asserted. When the portion of the command at the end of the burst is completed, this memory controller asserts the signal, which is one higher than specified by the memory command. The thread that issues the memory command checks for two signals: (1) the even signal specified in the memory command; and (2) the next higher odd signal to determine completeness of the memory operation.

In case where memory commands are not split, the second flag indicates that no stripping of data is to occur. That is, for commands that do not split, the memory controller asserts a "no split" signal when returning the even numbered signal specified in the command to-the processing thread. Thus, the issuing thread checks for two signals to determine when the memory operation has been completed irrespective of whether the memory command has been split at the memory controller. As GTS signaling provides 16 reusable signals per context swap, the processing cost of two signals per DRAM command is minimized, while the processor savings for the signal aggregation hardware can be advantageously maximized.

Figure 3:
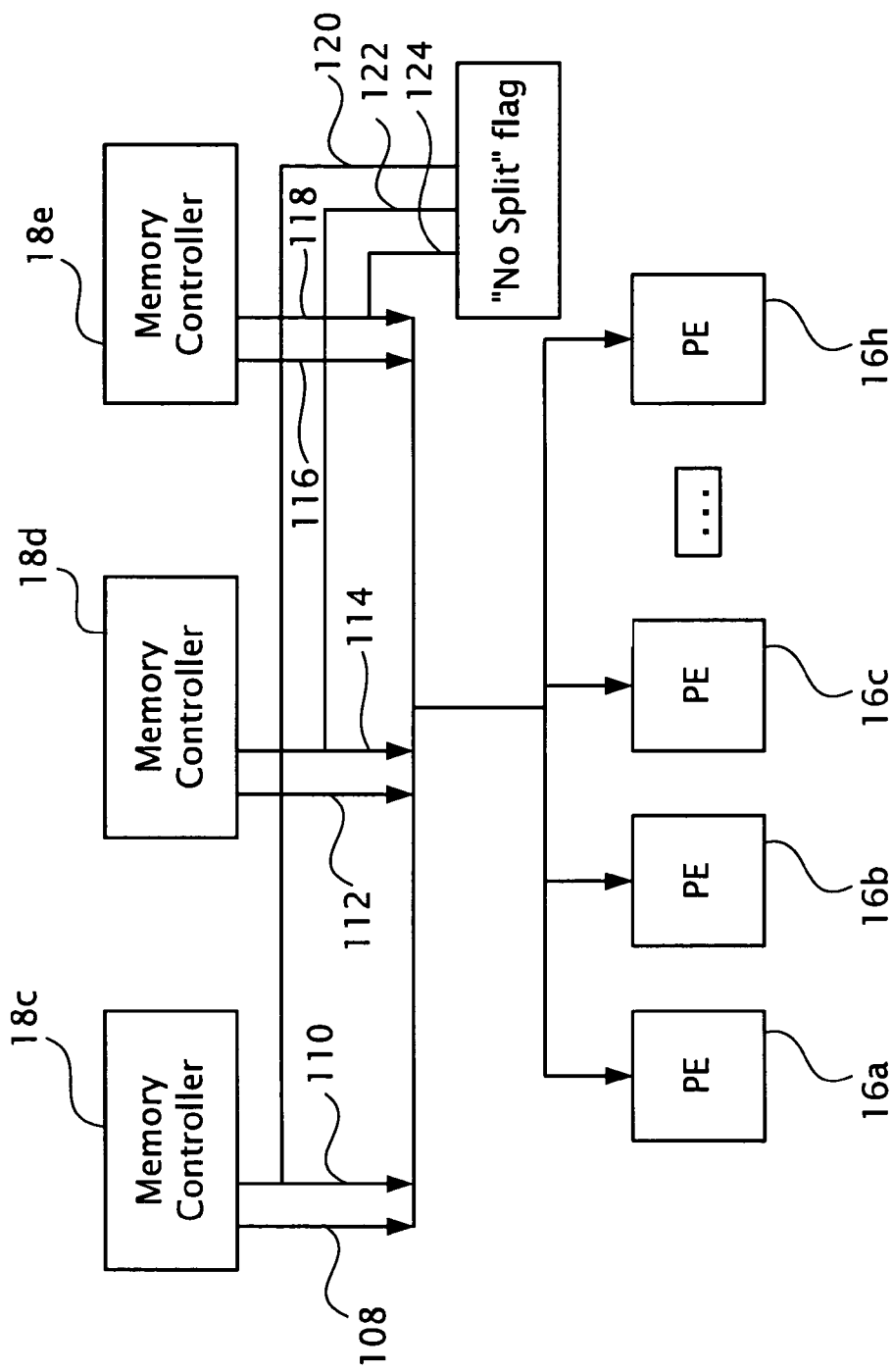
FIG. 3 is a block diagram of a generalized thread signaling mechanism where one of the embodiments of the invention may be advantageously practiced.

Referring to FIG. 3, programming engines of FIG. 1 are illustrated. Programming engines 16a, 16b, and 16c execute contexts issuing read, write and I/O operations. For example, programming engines 16a, 16b, and 16c are connected to memory controllers 18c, 18d, and 18e via multiple memory channels 108, 110, 112, 114, 116, 118 which provide the required bandwidth for store-and-forward operations and high frequency read/write/modify operations.

Upon completion of a memory command request, memory controllers 18c, 18d, and 18e send a signal to the issuing memory command request, indicating the operation has been completed.

In a multiple channel design such as the one illustrated in FIG. 3, interleaving block addresses spread accesses across the multiple memory channels 108, 110, 112, 114, 116, 118.

Signals 120, 122, and 124 represent the "no split" flag of the GTS mechanism. When the multiple memory channels 110, 114, and 118 are set with the "no split" flag signals, this indicates that no splitting of data has occurred and the multiple memory channels 108, 112, and 116 determine the completion of the memory operation, i.e., data is transferred in only one channel.

Figure 4:
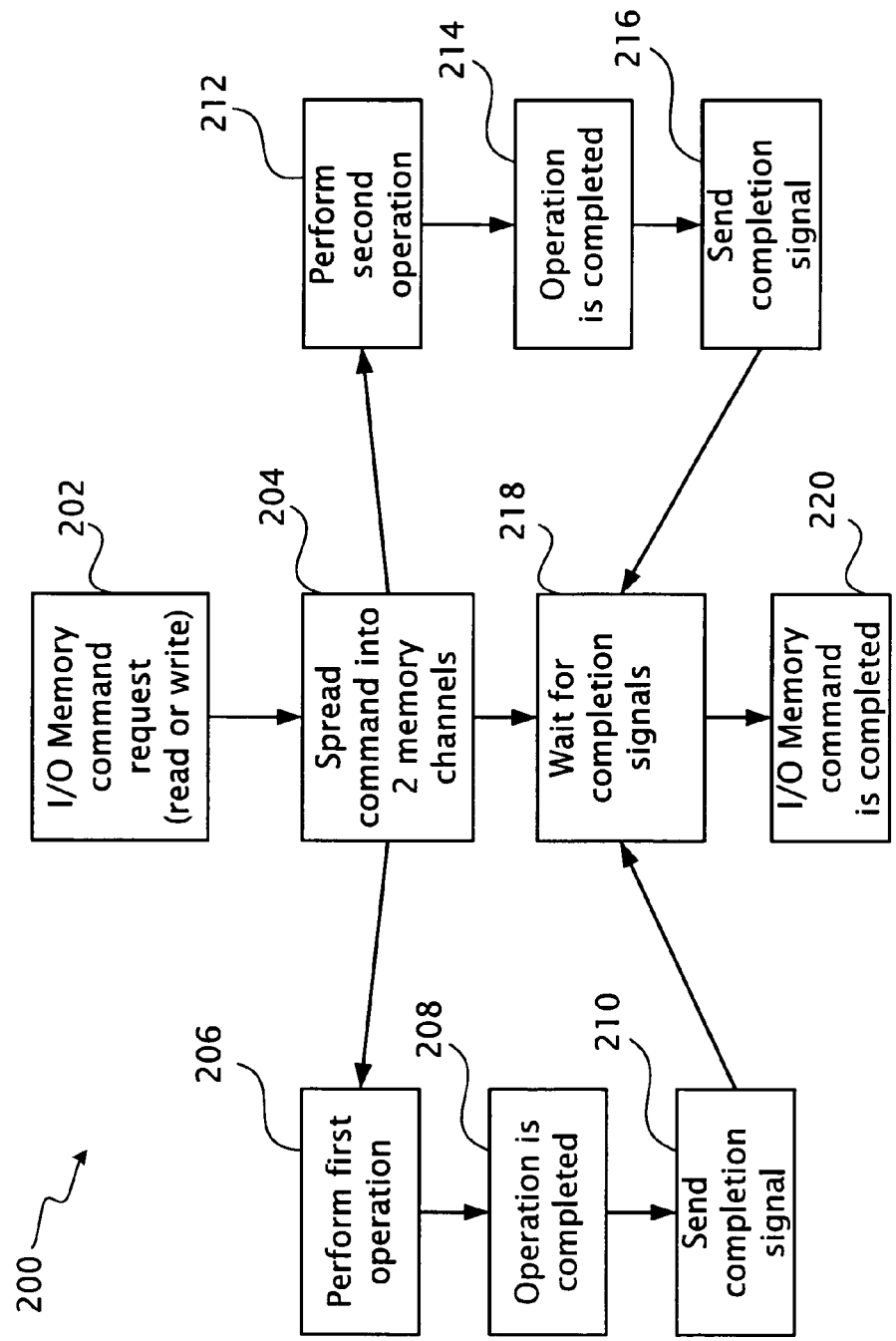
FIG. 4 is a flowchart illustrating details of a memory transfer operation.

Referring to FIG. 4, a memory operation process 200 is illustrated. An I/O memory command request is issued, e.g., a read or write request (202). The memory command request is spread into two channels (204). A memory controller, e.g., memory controller 18c, executes a first portion of the memory command operation on the first channel (206) and completes the operation (206). Upon completion of the first portion of the operation (206), the memory controller 18c sends a completion signal to the programming engine 16a (210). Simultaneously, because the command has been split, the memory controller 18c executes a second portion of the memory command operation on the second channel (212) and completes this operation (214). Upon completion, the memory controller 18c sends a completion signal (216) to the programming engine 16a. The programming engine 16a awaits (218) for a completion signal from the first operation (206 through 210) and second operation (212 to 216) to assert that the I/O memory command request has been completed (220).

In other words, I/O memory command request are parsed into two commands at the memory controllers. When the first portion of the command at the start of the burst is completed, an even numbered signal specified in the memory command is asserted. When the second portion of the command at the end of the burst is completed, the memory controller asserts the signal that is one higher than specified by the memory command. As described earlier, the thread that issued the memory command, checks for two signals, i.e., the even signal specified in the I/O memory command request and the next higher odd signal, to determine that the memory operation process 200 is now complete.

Referring to FIG. 5, a memory operation process 300 is illustrated. As above, an I/O memory command request is issued, e.g., read or write request (302). The memory command request is not spread into two channels (304). A memory controller, e.g., memory controller 18c, executes the memory command operation on the first channel (306) and completes the operation (308). Upon completion of the operation (308), the memory controller 18c sends a completion signal to the programming engine 16a (310). Upon completion, simultaneously, the memory controller 18c sends a "no split" signal to the programming engine 16a (312). The programming engine 16a awaits (314) for a completion signal from the memory controller. In this case, because the command has not been split, the programming engine 16a receives a "no split" signal (312). Thus, only the completion signal sent by the memory controller to the programming engine is utilized to determine the completion of the I/O memory command request (316).

Other Embodiments:

In the examples described above in conjunction with FIGS. 1-5, the computer processing system 10 may implement programming engines 16 using a variety of network processors, memory controllers, and memory channels.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method comprising:
    enabling transfers of data to a programming engine by parsing the data over selectively one memory channel or two memory channels; and
    establishing a generalized thread signaling mechanism in which a programming engine issues a memory command and at least a first number signal, and the programming engine checks for the first number signal and a second number signal to determine completion of the memory command, the first number being different from the second number.

2. The method of claim 1 wherein the first number signal is an even number signal, and the second number signal is an odd number signal.

3. The method of claim 1, further comprising determining whether the memory command requires parsing data over two memory channels.

4. The method of claim 1, further comprising, if the memory command requires parsing data over a first memory channel and a second memory channel, sending the specified number signal to the programming engine upon completion of transfer of a portion of the unit of data through the first memory channel, and sending the other number signal to the programming engine upon completion of transfer of a remaining portion of the unit of data through the second memory channel.

5. The method of claim 1, further comprising if the memory command does not require parsing data over two memory channels, sending the first number signal and the second number signal to the programming engine upon completion of the memory command.

6. A method comprising:
    issuing, from a programming engine, memory commands and associated number signals,
    at memory controllers, determining whether the memory commands require striping data over one or two memory channels, and returning two number signals upon completion of each memory command; and
    at the programming engine, detecting the number signals returned from the memory controllers to determine whether the memory commands have been completed.

7. The method of claim 6 wherein the memory controllers return an even number signal and an odd number signal upon completion of each memory command.

8. The method of claim 6, further comprising, if a memory command requires striping data over a first memory channel and a second memory channel, sending a first number signal associated with the memory command to the programming engine upon completion of transfer of a portion of the data through the first memory channel, and sending a second number signal to the programming engine upon completion of transfer of the remaining portion of the data through the second memory channel.

9. The method of claim 6, further comprising, if a memory command does not require striping data over two memory channels, sending a first number signal associated with the memory command and a second number signal to the programming engine upon completion of transfer of the data through a memory channel.

* * * * *